(12) United States Patent  (10) Patent No.: US 7,833,305 B1
Studer  (45) Date of Patent: Nov. 16, 2010

(54) FILTER DEVICE

(76) Inventor: Ronald M. Studer, 1820 E. Mansfield St., Bucyrus, OH (US) 44820

( * ) Notice: Subject to any disclaimer, the term of this patent is extended or adjusted under 35 U.S.C. 154(b) by 469 days.

(21) Appl. No.: 11/379,325

(22) Filed: Apr. 19, 2006

Related U.S. Application Data

(60) Provisional application No. 60/672,695, filed on Apr. 19, 2005, provisional application No. 60/685,619, filed on May 27, 2005.

(51) Int. Cl.
*B01D 46/00* (2006.01)
(52) U.S. Cl. .................... 55/419; 55/385.1; 55/467; 55/484; 55/487
(58) Field of Classification Search .............. 55/338, 55/385.1, 385.2, 419, 471, 472, 473, 385.7, 55/418, 467, 486–487, 495–511, DIG. 31, 55/484, 350.1
See application file for complete search history.

(56) References Cited

U.S. PATENT DOCUMENTS

| | | | |
|---|---|---|---|
| 4,191,543 A | | 3/1980 | Peters |
| 4,784,675 A | | 11/1988 | Leber et al. |
| 4,804,392 A | * | 2/1989 | Spengler ................... 55/356 |
| 5,010,777 A | * | 4/1991 | Yehl et al. ................ 73/864.81 |
| 5,288,298 A | * | 2/1994 | Aston ......................... 96/135 |
| 5,399,319 A | | 3/1995 | Schoenberger et al. |
| 5,564,626 A | * | 10/1996 | Kettler et al. ............. 236/49.3 |
| 5,761,908 A | | 6/1998 | Oas et al. |
| 5,954,577 A | * | 9/1999 | Meckler ...................... 454/75 |
| 6,119,689 A | * | 9/2000 | Korman .................. 128/205.29 |
| 6,156,089 A | * | 12/2000 | Stemmer et al. ............... 55/467 |
| 6,235,072 B1 | * | 5/2001 | Kopylov et al. ................ 55/338 |
| 6,302,783 B1 | * | 10/2001 | Vroege ....................... 454/233 |
| 6,364,923 B1 | * | 4/2002 | Wiedmeyer et al. ......... 55/385.2 |
| 6,692,348 B1 | * | 2/2004 | Cauthorne .................. 454/230 |
| 6,783,578 B2 | | 8/2004 | Tillman, Jr. |
| 6,808,546 B2 | * | 10/2004 | Schottler .................... 55/385.2 |
| 6,924,877 B2 | * | 8/2005 | Nakano et al. ................ 355/30 |
| 6,949,131 B2 | * | 9/2005 | Yeung ........................ 55/467.1 |
| 7,186,285 B2 | * | 3/2007 | Nakano et al. ............. 55/385.1 |
| 7,294,181 B1 | * | 11/2007 | Smith ......................... 96/397 |
| 2004/0065204 A1 | * | 4/2004 | Dietrich ....................... 96/111 |
| 2004/0159239 A1 | * | 8/2004 | Nagem ........................ 96/134 |
| 2007/0101688 A1 | * | 5/2007 | Wootton et al. ............ 55/385.2 |

* cited by examiner

*Primary Examiner*—Michael A Marcheschi
*Assistant Examiner*—Robert A Clemente
(74) *Attorney, Agent, or Firm*—Pearne & Gordon LLP

(57) ABSTRACT

A filter assembly for providing filtered air to an enclosed space includes a housing having an exhaust port in fluid communication with the enclosed space, a first air intake port in fluid communication with the enclosed space, and a second air intake port in fluid communication with a space exterior to the enclosed space. The assembly includes a disposable filter for filtering air from at least one of the first air intake port and the second air intake port. The assembly simultaneously filters recirculated air from the enclosed space and pressurizing air from the space exterior to the enclosed space. The filtered air is provided to the enclosed space through the exhaust port. Air pressure within the enclosed space exceeds the air pressure in the space exterior to the enclosed space when pressurizing air is drawn from the space exterior to the enclosed space and provided to the enclosed space.

17 Claims, 9 Drawing Sheets

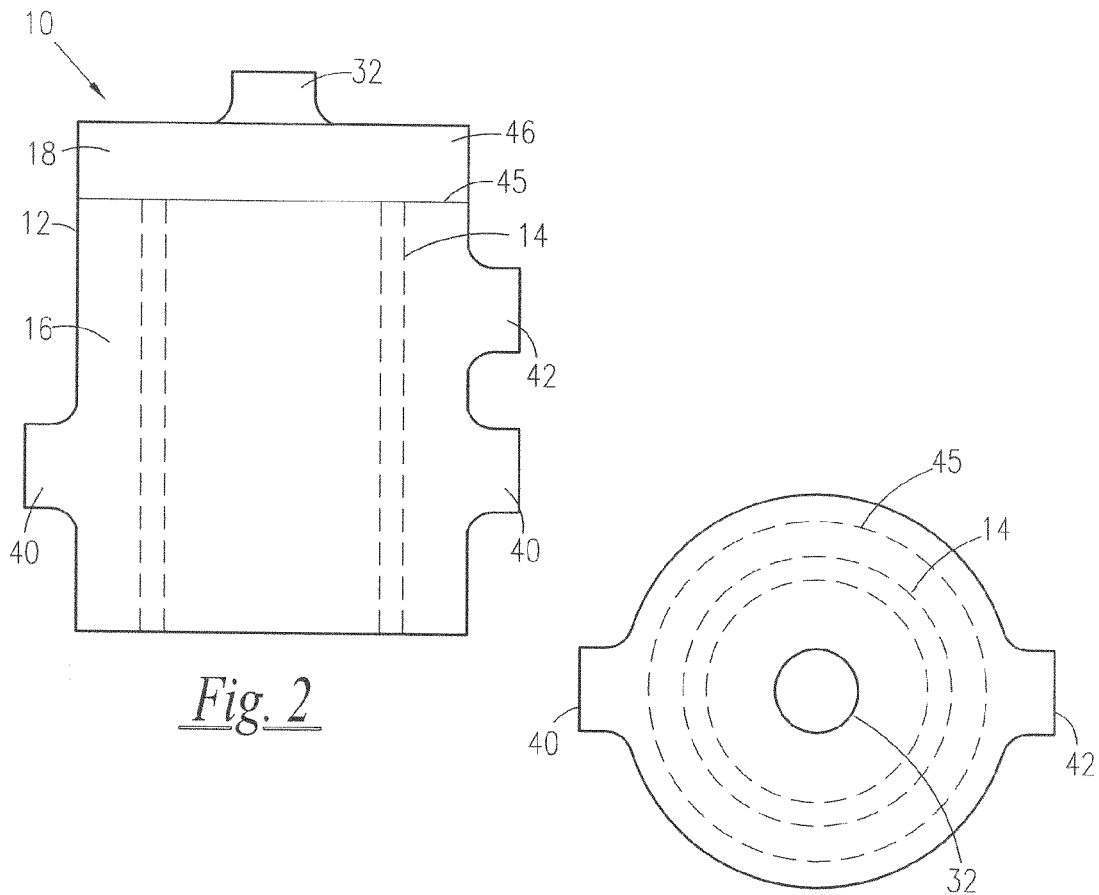
Fig. 2
Fig. 3
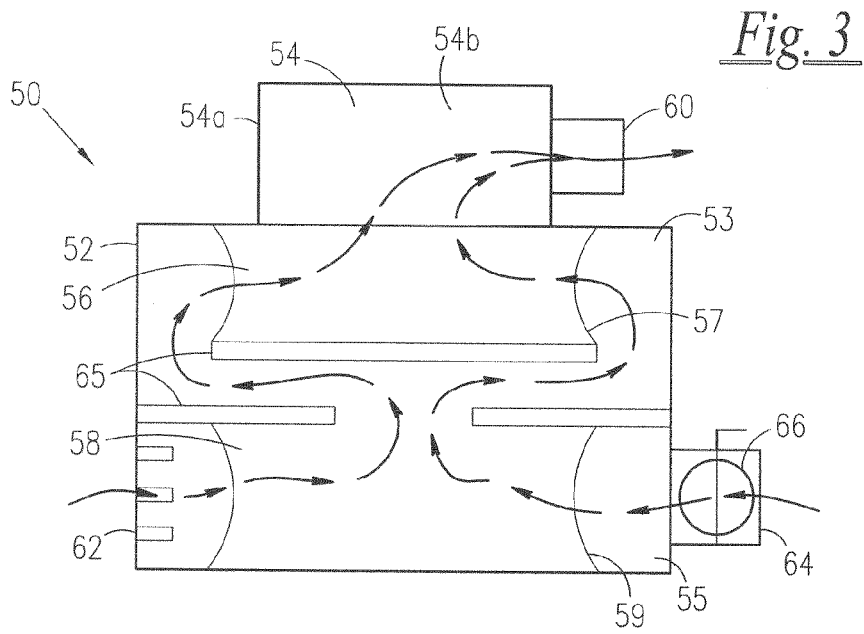
Fig. 4

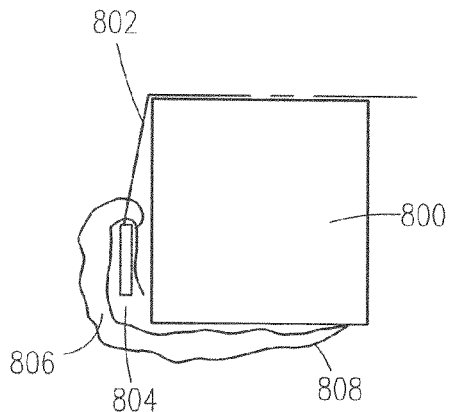 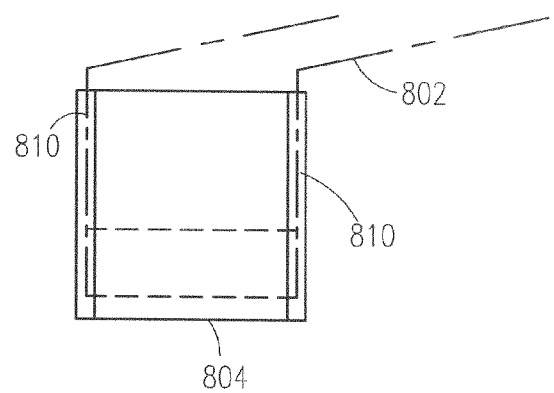
*Fig. 15*  *Fig. 16*
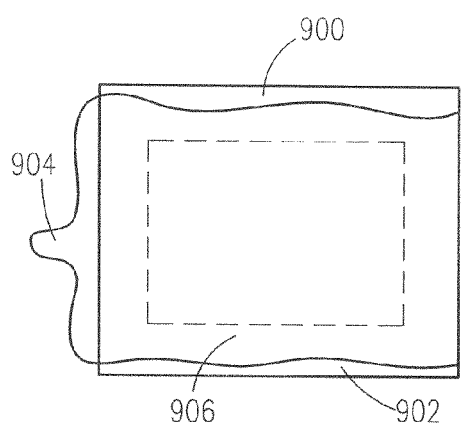 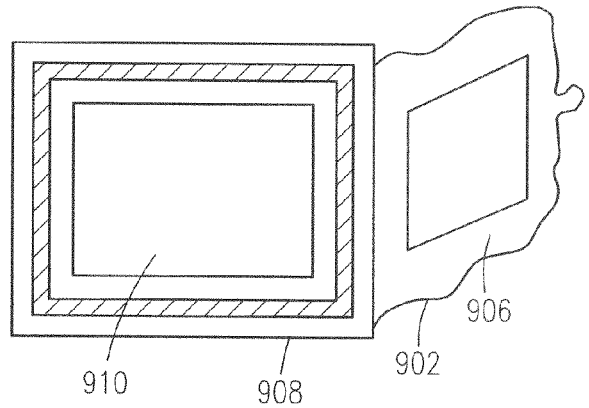
*Fig. 17*  *Fig. 18*

FILTER DEVICE

CROSS-REFERENCE TO RELATED APPLICATIONS

This application is based upon and claims the benefit of priority of U.S. Provisional Patent Application No. 60/672,695, filed Apr. 19, 2005 and U.S. Provisional Patent Application No. 60/685,619, filed May 27, 2005, the contents of which are hereby incorporated by reference. U.S. patent application Ser. No. 10/966,014, filed Oct. 15, 2004, now published as U.S. Pat. No. 7,387,652, is herby incorporated by reference.

FIELD OF THE INVENTION

The present invention relates to an air filtering system and more specifically to an improved air filtering system capable re-circulating internal air and introducing external air to create a positive pressure in a room.

BACKGROUND OF THE INVENTION

Due to the growing concerns regarding potential biological or chemical terrorist attacks, the applicant has recognized that a need exists in the state of the art for an inexpensive and simple-to-use filter which can effectively remove dangerous contaminated particles from the air within an enclosed space, such as a room in a home, a school class room, an office, and a vehicle, for example, while simultaneously providing a positive pressure within the enclosed space sufficient to prevent migration of the contaminated particles through small cracks or openings that may be present between the enclosed space and outside of the space.

Duct tape and plastic sheeting covering doors and windows provide some protection from airborne contaminants; however, such measures will not provide an airtight seal for particles as small as about 1.0 micron in diameter (about the size of an anthrax spore, for example). Thus, creating a positive pressure within the enclosed space, in accordance with the present invention, minimizes the introduction of such contaminants into the enclosed space.

BRIEF SUMMARY OF THE INVENTION

Provided is a filter assembly for providing filtered air to an enclosed space. The filter assembly includes a housing comprising an exhaust port in fluid communication with the enclosed space, a first air intake port in fluid communication with the enclosed space, and a second air intake port in fluid communication with a space exterior to the enclosed space. The filter assembly includes a disposable filter for filtering air from at least one of the first air intake port and the second air intake port. The filter assembly is arranged for simultaneously filtering recirculated air drawn from the enclosed space through the first air intake port and filtering pressurizing air drawn from the space exterior to the enclosed space through the second air intake port. The filtered air is provided to the enclosed space through the exhaust port. An air pressure within the enclosed space exceeds an air pressure in the space exterior to the enclosed space when pressurizing air is drawn from the space exterior to the enclosed space and provided to the enclosed space.

Further provided is a filter assembly for providing filtered air to an enclosed space. The filter assembly includes a filter unit including a high-efficiency particulate air filter, and an air plenum in fluid communication with the filter unit and the enclosed space. The filter unit and the air plenum are adapted for installation in a heating or cooling system. The filter unit is in fluid communication with a space that is exterior to the conditioned space and exterior to the air plenum. Pressurizing air is moved from the space that is exterior to the conditioned space and exterior to the air plenum through the filter unit and into the air plenum so that an air pressure within the conditioned space exceeds an air pressure in the space that is exterior to the conditioned space and exterior to the air plenum.

Further provided is a filter assembly for providing filtered air to an enclosed space. The filter assembly includes a filter unit including a housing and having an air intake port through the housing, and a removable shield at least partially covering said air intake port. Air from a space external to said enclosed space is drawn through the shield by the filter unit.

Further provided is a method of operating an air filter comprising the steps of providing a filter assembly comprising a housing including an exhaust port in fluid communication with the enclosed space, a first air intake port in fluid communication with the enclosed space, and a second air intake port in fluid communication with a space exterior to the enclosed space, and a disposable filter for filtering air from at least one of the first air intake port and the second air intake port. The filter assembly is arranged for simultaneously filtering recirculated air drawn from the enclosed space through the first air intake port and filtering pressurizing air drawn from the space exterior to the enclosed space through the second air intake port. The filtered air is provided to the enclosed space through the exhaust port. The method includes the step of providing a fan. The fan is adapted to create a partial vacuum at the first air intake and the second air intake. The method includes the steps of running the fan, sealing filtered contaminates within the filter assembly, and stopping the fan after sealing filtered contaminates within the filter assembly.

Further provided is a filter assembly for providing filtered air to an enclosed space. The filter assembly includes an inflatable enclosure. The enclosed space is at least partially defined by the inflatable enclosure. The filter assembly includes a housing comprising an exhaust port in fluid communication with the enclosed space, a first air intake port in fluid communication with the enclosed space, and a second air intake port in fluid communication with a space exterior to the enclosed space. The filter assembly includes a filter for filtering air from at least one of the first air intake port and the second air intake port. The filter assembly is arranged for simultaneously filtering recirculated air drawn from the enclosed space through the first air intake port and filtering pressurizing air drawn from the space exterior to the enclosed space through the second air intake port. The filtered air is provided to the enclosed space through the exhaust port. An air pressure within the enclosed space exceeds an air pressure in the space exterior to the enclosed space when pressurizing air is drawn from the space exterior to the enclosed space and provided to the enclosed space.

BRIEF DESCRIPTION OF THE DRAWINGS

FIG. 2 is a front view of another embodiment according to the present invention utilizing a molded plastic housing with integral air intake and exhaust ports;

FIG. 3 is a top view of FIG. 2;

FIG. 4 is a side view of another embodiment according to the present invention where the external air intake port incorporates a baffle;

FIG. 15 is a side elevation view of a sealable packaged filter;

FIG. 16 is a front view of the sealable packaged filter of FIG. 15;

FIG. 17 is a side view of a sealable packaged filter;

FIG. 18 is a side view of a sealable packaged filter of FIG. 17;

DETAILED DESCRIPTION OF THE INVENTION

The invention provides a filter assembly for filtering the air of an enclosed space, such as an enclosed room, for example, and for providing a positive air pressure in the enclosed space in order to prevent contaminated air from entering the space from outside the enclosed space.

Figure 1:
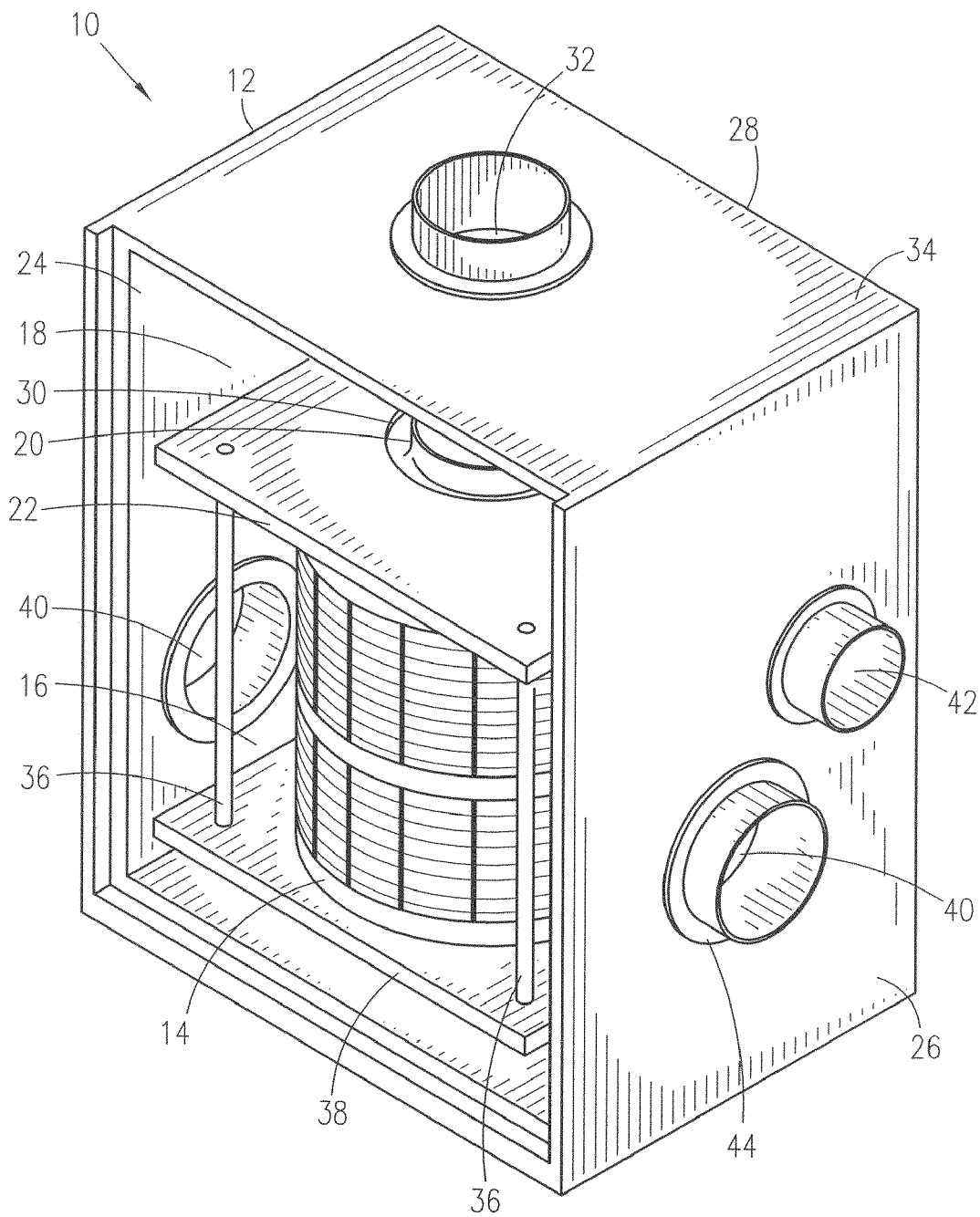
FIG. 1 is a perspective view of one embodiment showing the location of a purification filter according to the present invention.

Referring now to the drawings, which are for purposes of illustrating an example of the invention only and not for purposes of limiting the same, FIG. 1 shows a first embodiment of a filter assembly 10 in accordance with the present invention. The filter assembly 10 includes an enclosure 12 and a purification filter 14. In regard to all embodiments described below, the enclosure 12 may be constructed of any suitable material known in the art that provides a rigid, leak tight enclosure such as wood, metal, plastic, fiberglass, etc. Further, the purification filter 14 can be any suitable type of filter commonly known in the art, such as high-efficiency particulate air (HEPA) filter, an air filter similar to that of an automotive carburetor filter, an oil filter, a charcoal filter, etc. for filtering out small particles of dust and biological matter. A motor 54, shown in the third embodiment, drives a fan, thereby creating a vacuum in the enclosure 12 as will be described below. The motor may be any type of motor 13 known in the art. The motor 13 can be electrically powered, for example, by any conventional means such as known in the art such as a DC or an AC source, a solar source, a battery source, etc. Furthermore, the fan may be driven by any other means known in the art such as, for example, a winding device.

Referring now to FIG. 1, a panel of the enclosure 12, preferably a front panel is removable to allow installation of the purification filter 14. The enclosure 12, along with partition 22, forms a first and second chamber. The first chamber houses the purification filter 14 and is referred to as the filter chamber 16. The second chamber, located adjacent to the filter chamber 16, is an exhaust chamber 18 that houses an exhaust duct 20. The partition 22 separates the chambers 16, 18 and is securely attached to the sidewalls 24, 26 and back wall 28 of the enclosure 12. The partition 22 further forms an opening 30 to allow the exhaust duct 20 to extend from the top of the purification filter 14 into the exhaust chamber 18 and out through an exhaust port 32 located on top 34 of the enclosure 12. The size of the exhaust port 32 can be any suitable size to allow adequate airflow out of the purification filter 14. Furthermore, the exhaust port 32 can be tied into any existing vent that vents air outside of the enclosed space, such as a dryer vent.

In the embodiment shown in FIG. 1, the exhaust port 32 has a diameter of about eight inches. It should be noted that it is not necessary to have a single exhaust port exhausting the air out of the top of the enclosure. For example, the air can be exhausted out of any of the four walls or the top by using a single or multiple exhaust ports.

The partition 22 also serves as a means of supporting the purification filter 14. Support rods 36 are attached to the partition 22 by any means known in the art, such as screws, bolts, glue, etc., for example, and extend from the partition 22 to a support platform 38. The support rods 36 are also attached to the support platform 38 in the same or similar manner that they are attached to the partition 22. As shown in FIG. 1, the purification filter 14 sits on the support platform 38. The support platform 38 can be made to adjust vertically to accommodate different sized purification filters 14.

The enclosure 12 further includes one or more openings or air intake ports to introduce internal and/or external air into the filter assembly 10. The embodiment shown in FIG. 1 includes two internal air intake ports 40 for re-circulating air from within an enclosed room, for example, and one external air intake port 42 for introducing air outside the enclosed room into the enclosed room. Thus, filter assembly 10 can simultaneously re-circulate air internal to the room and introduce external air as well. By re-circulating internal air, the air can be further filtered and cleaned, whereas the introduction of external air into the room via the filter assembly 10 creates a positive pressure within the enclosed room thereby preventing contaminated particles via external air from entering the enclosed space.

The air intake ports 40, 42 are positioned such that the air entering through any given air intake port 40, 42 enter the filter chamber 16 and travels through the purification filter 14 before being exhausted into the enclosed room. The air intake ports 40, 42 can be any suitable size to provide an adequate flow of air into the filter assembly 10. In the embodiment shown in FIG. 1, the internal air intake port 40 has a diameter of about six inches and the external air intake port 42 has a diameter of about four inches.

The filter assembly 10 may include a sealing means such as a ductwork collar 44 to seal the air intake ports 40, 42 and exhaust port 32 to the enclosure 12 to provide an airtight connection to the external ductwork.

FIGS. 2 and 3 show variations of an embodiment in accordance with the present invention. In this embodiment the enclosure 12 is preferably made of a formable material, such as plastic, for example, where the air intake ports 40, 42 and the exhaust port 32 are an integral part of the enclosure 12 thus reducing manufacturing costs. In addition, the integrated design provides a more reliable leak tight seal with the external ductwork.

In the filter assemblies 10 in FIGS. 2 and 3, a lip 45 is circumferentially formed around an upper portion 46 of the enclosure 12. When the purification filter 14 is installed into the enclosure, the top of the purification filter 14 comes into contact with the lip 45 thereby forming a seal and thus providing a filter chamber 16 below the seal and an exhaust chamber 18 above the seal. Therefore, the air, whether external or internal, enters the filter chamber 16, and then travels through the purification filter 14 before being exhausted into the enclosed room. The integrated seal design further reduces manufacturing costs.

As shown in FIG. 1, the filter assembly 10 further includes the partition 22. The partition 22 may be positioned in the upper portion 46 of the enclosure 12 above the purification filter 14 to thus create the filter chamber 16 and the exhaust chamber 18. The partition 22 may be attached to the inside of the enclosure 12 by any means known in the art such as snapping, screwing, etc., for example. The partition 22 further includes an opening 30 to allow the exhaust duct 20 to extend from the top of the purification filter 14 through the exhaust chamber 18 and out the top of the enclosure 12.

FIG. 4 shows an embodiment of a filter assembly in accordance with the present invention. As in the above-mentioned embodiments, the filter assembly 50, includes an enclosure 52, a motor 54 with a motor housing 54a that forms an exhaust chamber 54b, a first purification filter 56, an exhaust port 60, multiple internal air intake ports 62, and an external air intake port 64.

The filter assembly 50 further includes a filter chamber 53 that houses the purification filter 56 and a second filter chamber 55 that can house a second purification filter, as will be described below. Furthermore, as an option, multiple pre-filters may be added to facilitate the air purification process. It should be noted that any number of pre-filters can be added to the filter assembly 10 to facilitate the air purification process that will be subsequently described.

Referring to FIG. 4, a second purification filter 58 can also be added and may be positioned adjacent to the first purification filter 56. Thus, the incoming air will travel through the second purification filter 58 first before it passes through the first purification filter 56. The second air filter 58 is designed to remove larger particles of debris from the air prior to reaching the first purification filter 56, thereby extending the life and utility of the first purification filter 56.

In addition, a first pre-filter 57 may be added and positioned around the first purification filter 56. Accordingly, any air traveling through the filter assembly 10 will first travel through the first pre-filter 57 prior to passing through the first purification filter 56. The first pre-filter 57 may be any type of air purification filter known in the art such as a charcoal filter, for example. During the air filtration process, the first pre-filter 57 absorbs organic vapors and controls odor thereby extending the life of the first purification filter 56.

Furthermore, a second pre-filter 59 may be positioned around the second purification filter 58 to prevent organic vapors from entering the second purification filter 58 thus extending the life of the second purification filter 58. Therefore, as illustrated above, any number of filters and pre-filters can be utilized to improve the air purification process and extend the life of the first purification filter 56.

The enclosure 12 can further include seal panels 65 that secure the first 56 and second 58 purification filters in place. The bottom of the first purification filter 56 and the top of the second purification filter 58 are attached to the seal panels 65 such that an airtight seal is formed around the outer edge of the filters 56, 58. An airtight seal is also formed between the enclosure 52 and the top outer edge of the first purification filter 56 and the bottom outer edge of the second purification filter 58. The seals prevent any leakage of air that would result in the introduction of contaminated particles into the enclosed space and therefore result in a loss of efficiency of the filter assembly 50.

Still referring to FIG. 4, the filter assembly 50 can further include a baffle 66 positioned inside the external air intake port 64. The baffle 66 allows the user to monitor or control the amount of external air that is introduced into the enclosed space. Thus, if the user wants more external air introduced into the enclosed space, the user simply opens the baffle 66. Conversely, if the user wants less external air introduced into the enclosed space, the user simply closes the baffle 66. The baffle 66 can be controlled either manually or automatically by a mechanical or electrical means. It should be noted that a baffle, louver, etc. can also be attached to the internal air intake port 62. Thus, the filter assembly 50 can have one or multiple baffles, louvers, etc. incorporated in the design, for example.

Referring again to FIG. 4, the operation of the filter 50 will now be described. Once the filter assembly 50 has been installed in a desired location and all external ductwork is installed, the user switches the motor 54 to the on position. The motor 54 drives a fan which pumps air out of the enclosure 52 thus creating a partial vacuum in the enclosure 52. The vacuum causes air to be drawn into the enclosure 52 simultaneously through the internal air intake ports 62 and the external air intake port 64. Referring to the arrows shown in FIG. 4, for that embodiment, the air travels in the following path: 1) through the second pre-filter 59, 2) through the second purification filter 58, 3) around the seal panels 65, 4) through the first pre-filter 57, 5) through the first purification filter 56, 6) into the motor housing 55, and 7) out through the exhaust port 60 into the enclosed space.

Thus, in that embodiment the air travels through two pre-filters 57, 59, the second purification filter 58, and the first purification filter 56 prior to entering the enclosed space. During operation of the filter assembly 50 the user can adjust the baffle 66 to increase or decrease the amount of airflow into the enclosed space. Furthermore, because air is being drawn into the enclosure 52 through both the internal air intake port 62 and the external air intake port 64, the filter assembly 50 is simultaneously filtering and thus cleaning the internal enclosed space air and preventing contaminants from entering the enclosed space by creating a positive pressure in the enclosed space.

In the event of a power outage, the embodiment shown in FIG. 4 can still provide filtered air into the enclosed space providing the filter assembly is equipped with a baffle or louver on the internal air intake port 62. Under these circumstances, the user simply closes the baffle or louver on the internal air intake port 62 and if the enclosed space is at a negative pressure, air will enter through the external air intake port 64, travel its normal path, and enter the enclosed space through the exhaust port 64. The baffle can also be used to increase the amount of external air added to the room by limiting the recirculation of internal air.

Figure 5:
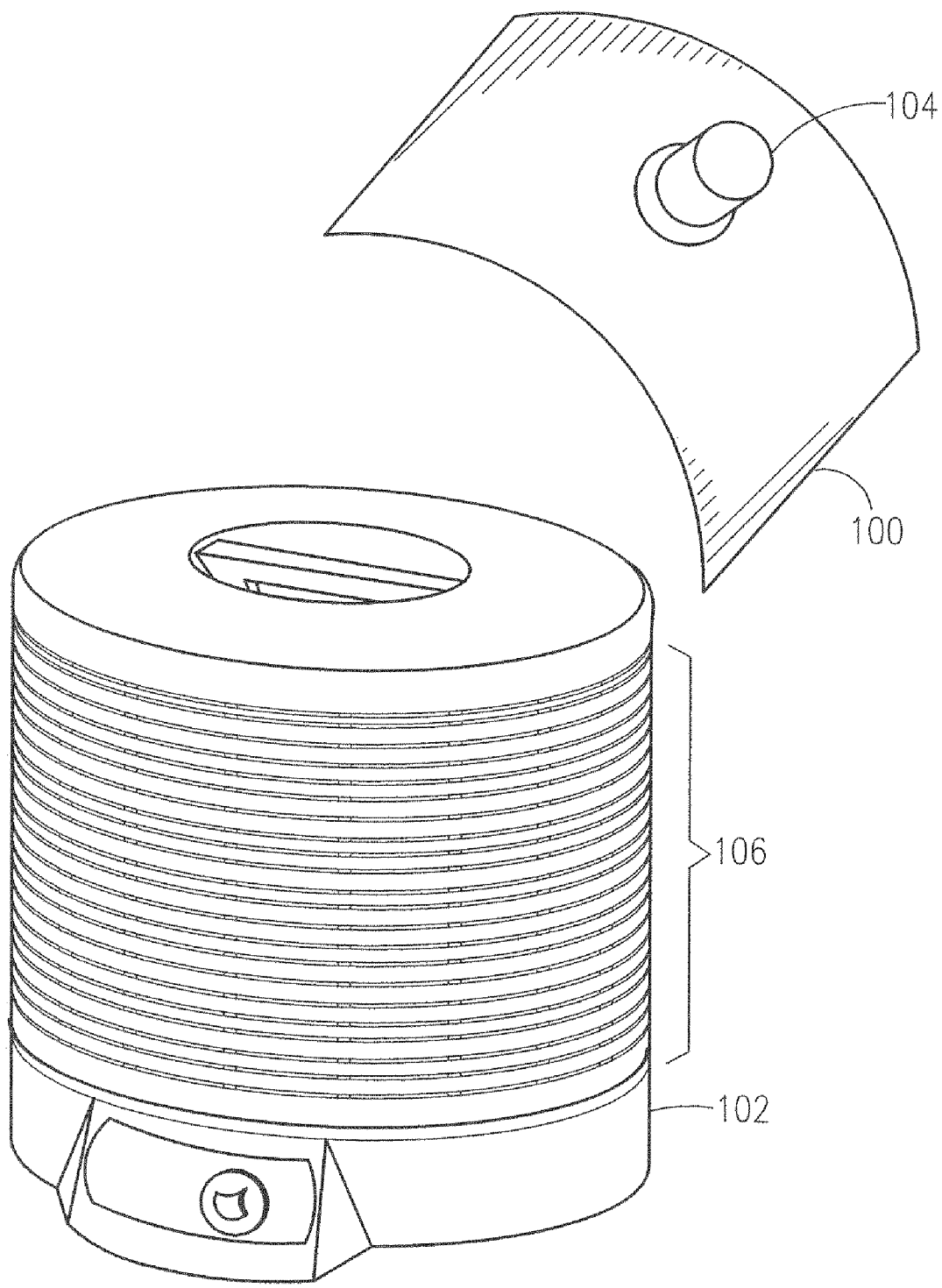
FIG. 5 is a perspective view of an air filtration unit and a shield accessory that includes a connection point for providing external air to the filtration unit.

Turning to FIG. 5, an embodiment of a filtration device capable of pressurizing a space includes a filter unit 102 and a shield assembly 100. The filter unit 102 is a commercially available air cleaner or purifier having a fan that draws ambient air through a grill 106 and a filter within the filter unit 102, and discharges filtered air back to the environment. The shield assembly 100 is designed to fit over a portion of the grill 106. When the filter unit 102 is operated with the shield in place, a vacuum is created at the air connection point 104 of the shield assembly 100. The air connection point 104 surrounds an aperture in the shield assembly 100 and is useful for connecting a source of pressurizing air to the filter unit 102. For example, one end of a hose can be connected to the air connection point 104, and the other end placed in fluid communication with a source of pressurizing air. For example, the other end of the hose can be connected to a source of outside air. When the filtration unit is operated, outside air will be drawn through the hose and aperture in the shield assembly 100 and be filtered by the filtration unit. Preferably, the connection point 104 provides an airtight seal between the shield assembly 100 and the connection point 104, so that drawn air travels from an entrance opening in the connection point 104 and through the shield 100 and filter unit 102 without escaping into the space in which the filter unit 102 is located prior to filtration. The outside air can pressurize the space in which the filter unit 102 is placed, in a manner as described above.

Figure 6:
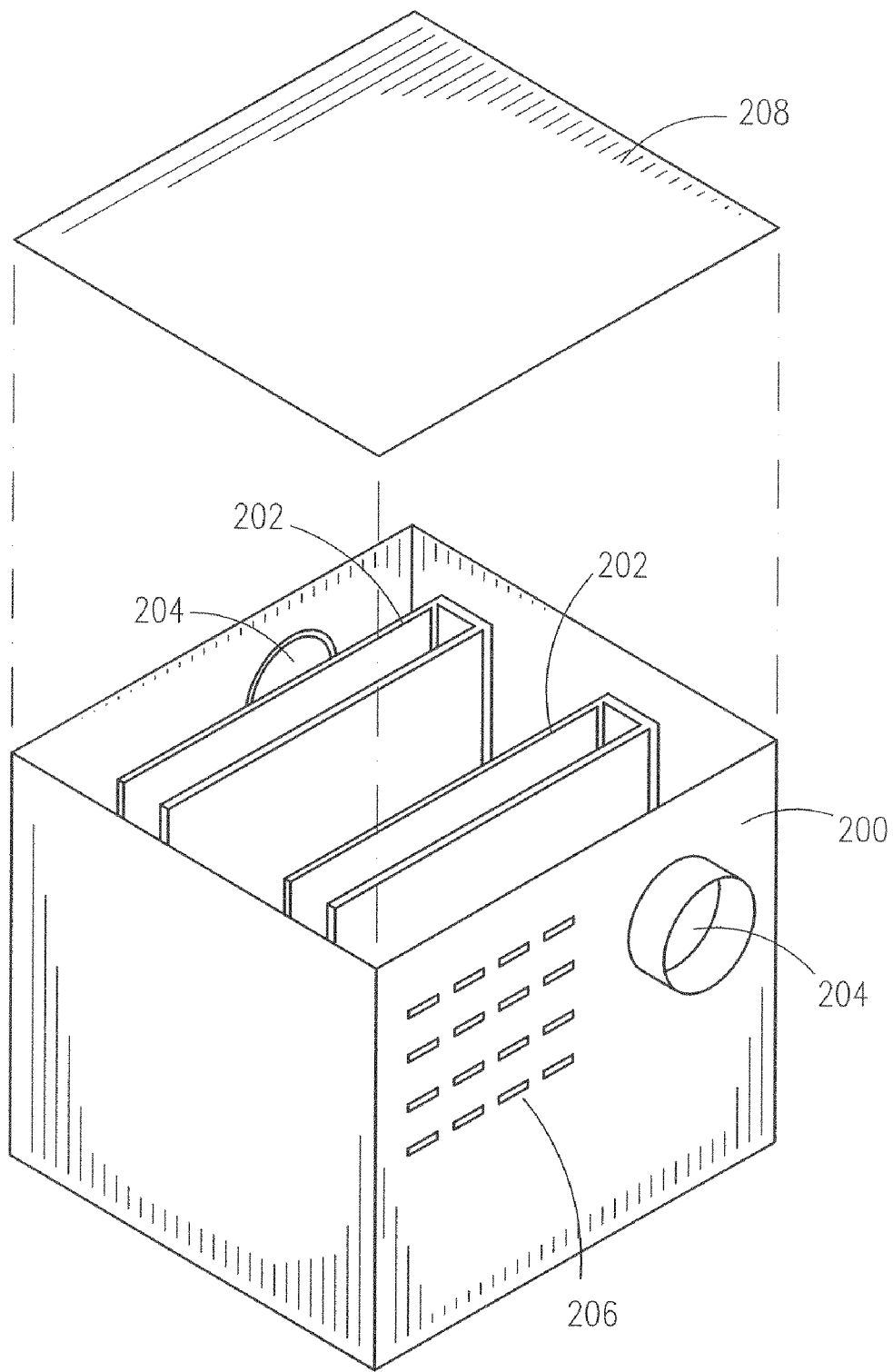
FIG. 6 is a perspective view of a filtration box according to the present invention.

Turning to FIG. 6, an embodiment of the present invention includes a box 200, for example a cardboard box, wooden box, metal box, or plastic box for enclosing one or more filter 202, for example high-efficiency particulate air (HERA) filters. The box 200 and enclosed filters 202 are designed to be disposable and replaceable as a unit, rather than utilizing filters capable of individual replacement. The filters 202 can be substantially permanently and irremovably installed within the box 200, for example glued or otherwise adhered to the box 200. Alternatively, the filters 202 can be removably installed within the box 200, and the box 200 can be reused and individual filters 202 can be replaced as necessary. A non-disposable fan (not shown) is configured to draw air exterior to the box 200 through openings in the box. For example, the box 200 can be provided with an aperture such as a hole or grill 206 to allow air exterior to the box to pass through a wall of the box and the filter 202 located therein. A connection point 204 can be provided for connecting a source of air, for example, a source of air external to the space in which the box 200 is located, directly to the aperture. Preferably, the connection point 204 provides an airtight seal between the wall of the box 200 and the connection point 204, so that drawn air travels from an entrance opening in the connection point 204 and through the wall of the box 200 and filter 202 without escaping into the space in which the box 200 is located prior to filtration.

The box 200 includes a discharge opening (not shown) for connection to the fan. The discharge opening provides fluid communication between the fan and the downstream side of the filters. For example, the opening can be located on the top 208 or the side of a box 200 between the filters 202. Air is drawn by the fan through the openings in the box 200 and through the filters 202 and then through the discharge opening to be discharged into the space in which the box 200 is located. If it is desirable to pressurize the space in which the box 200 is located, the connection point 204 can be connected to a source of pressurizing air as described above. When a filter change is desired, the entire box 200 including the filters 202 and any debris, for example, previously filtered debris located within the box, can be discarded. Alternatively, the entire box and its contents can be incinerated or disinfected prior to discarding.

A method for replacing the box 200 will now be described, wherein the box 200 is connected to source of pressurizing air through the connection point 204. While the fan is running, the intake openings, for example the grill 206 and connection point 204 are sealed by deployable seals to prevent the discharge of debris or filtered contaminants from the interior of the box through the intake openings. The sealing can be by any methods known in the art, such as sealing with plastic sheeting, for example. In addition, the source of pressurizing air can be sealed so that unfiltered air is not permitted to enter the space in which the box 200 is located. When these sealing steps have been completed, the fan can be turned off and disconnected from the box 200. By maintaining operation of the fan during the foregoing sealing steps, debris will remain trapped within the box due to the vacuum created by the fan. After the fan is turned off, it is disconnected from the discharge opening and the discharge opening is sealed. The filter box 200 so sealed is then stored, discarded, incinerated, or disinfected as desired. A replacement filter box 200 is then reconnected to the fan and source of pressurizing air, and the entire system is placed again into operation.

The disposable filter described above can also be incorporated into a window-mounted unit that directly draws pressurizing air from outside of the window opening to pressurize a space. Such an embodiment can include a seal for the pressurizing air intake that is operable from within the pressurized space. For example, the unit can include [a projection, such as,] a pull-tab or a string that causes a seal to deploy thereby sealing the air intake. Such a seal can be operated while the unit's fan is running, to ensure that debris is kept within the unit. Alternatively, a window-mounted unit may have a preferably non-disposable enclosure for housing replaceable filters.

Figure 7:
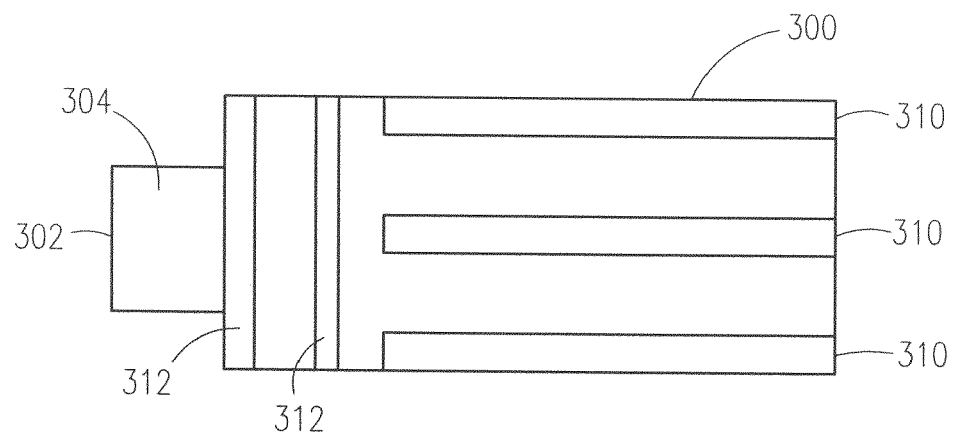
FIG. 7 is a top view of a filter for a building-mounted heating, ventilation and air-conditioning (HVAC) system according to the present invention.
Figure 8:
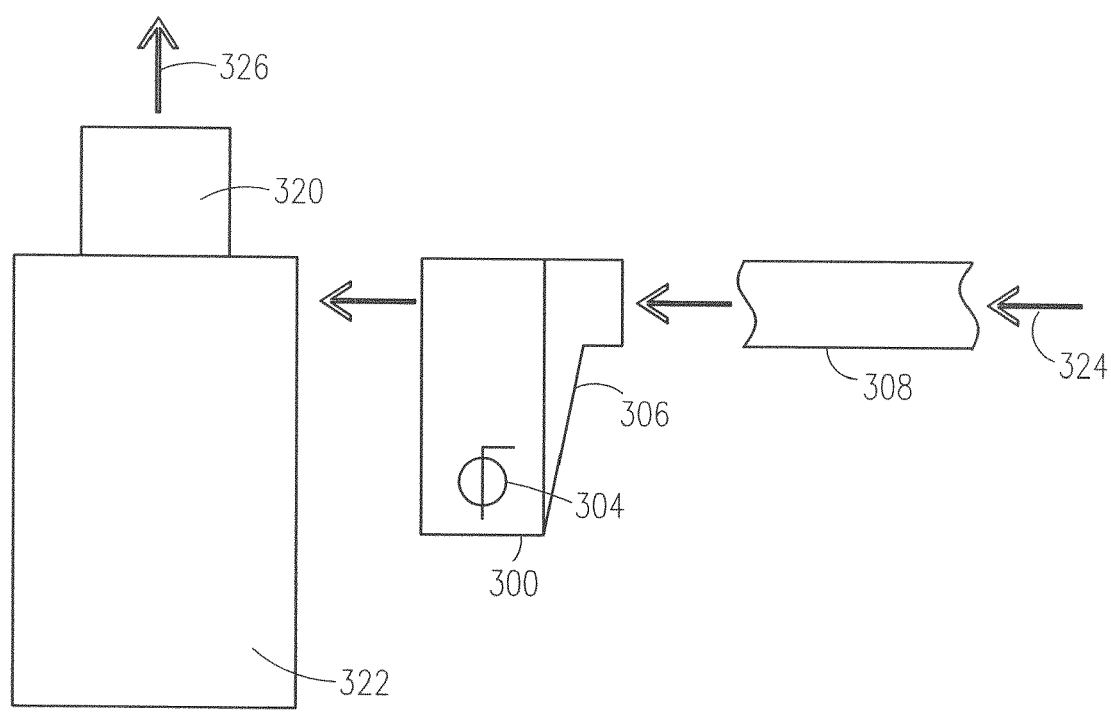
FIG. 8 is a plan view of a heating, ventilation and air-conditioning (HVAC) system according to the present invention.

Turning to FIGS. 7 and 8, an embodiment of the present invention includes a filter box 300 for housing filter media, such as a high-efficiency particulate air (HEPA) filter or filters 310 and 312. The filter box 300 is configured to be a component of a building or other structure's heating, ventilation and air-condition (HVAC) system. For example, the filter box 300 may be installed along, and form a part of, a cold air return plenum 306 or ductwork 308. The filter box 300 includes an outside air duct 304 having a connection point 302 for a connection to source of pressurizing air as described above. The filter box 300 may include a driven fan (not shown) to draw air through the filter 312. Alternatively, air may be pulled through the filter box 300 by a fan in the heating, ventilation and air-condition (HVAC) system. In a unit that includes a fan, it is preferable to install the unit downstream of certain heating, ventilation and air-condition (HVAC) equipment, such as a furnace 322 or a room air plenum 320, for example, in order to avoid pressurizing the heating, ventilation and air-condition (HVAC) equipment. Referring to the arrows shown in FIG. 8, cold air 324 is drawn to the filter box 300 through the cold air plenum 306 or ductwork 308, and filtered air 326 is exhausted to an enclosed space.

In one embodiment, the individual filters of the filter box 300 are replaceable and the filter box 300 is designed for more permanent installation. In another embodiment, the entire filter box 300, including filters 310 and 312 installed therein, is readily replaceable. In addition to the filters 312 for filtering pressurizing air, the filter box 300 may include filters 310 for filtering return air for the heating, ventilation and air-condition (HVAC) system. The pressuring air filters 312 include one or more of a pre-filter, high-efficiency particulate air (HERA) filter, and furnace filter, and the return air filters 310 include one or more of a pre-filter, high-efficiency particulate air (HEPA) filter, and furnace filter. It may be desirable to include a pre-filter upstream of a high-efficiency particulate air (HERA) filter to increase the useful life of the high-efficiency particulate air (HEPA).

The embodiments described herein that include filters have been described as having mechanical media filters. However, it will be appreciated that ionic or electronic filters can also be employed. Furthermore, such ionic filters can be of an inexpensive and/or disposable type. For example, ionic filters that comprise an inexpensive metallic foil, such as aluminum foil, can be employed to provide disposable ionic filters. It will be appreciated that ionic and electronic filters require a power supply. A single power supply can be provided for multiple filter units that include ionic or electronic filters. For example, a building having a plurality of rooms with individual filter units located therein, wherein the filter units include ionic or electronic filters can have a single power supply for supplying all filter units. The power supply can be provided on one of the filter units, or be located at a remote location. Power can then be supplied to each filter unit as desired via appropriate wiring.

Figure 9:
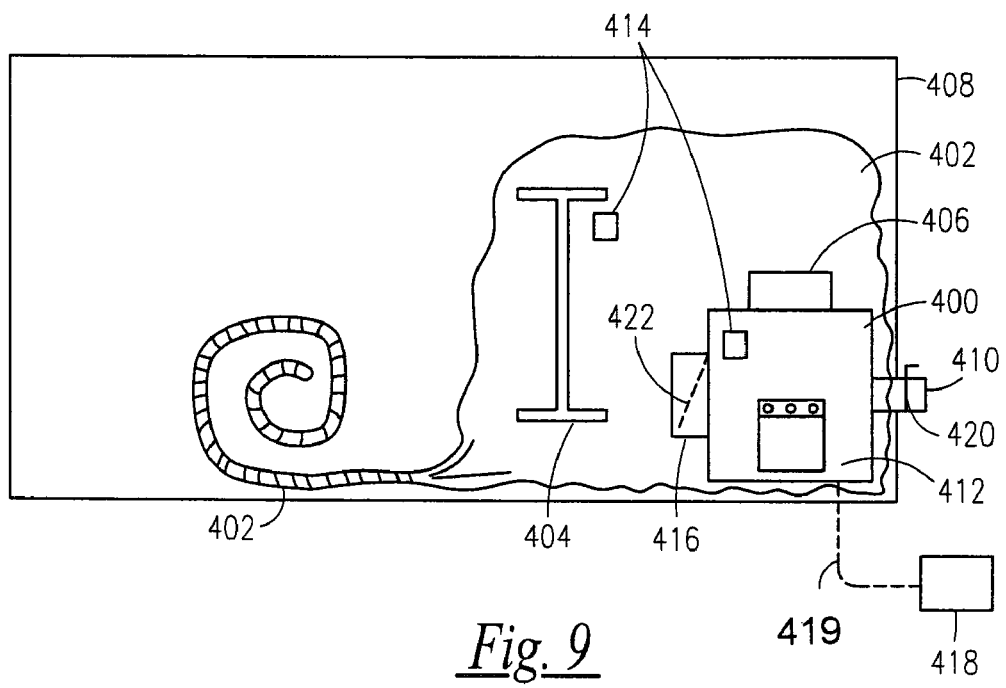
FIG. 9 is an elevation view of an enclosed space having a filter device that has been pre-sealed in an airtight bag.

FIG. 9 shows a filter device 400 comprising a fresh air intake 410, a room air intake 416, a filtered air exhaust 406 and a high-efficiency particulate air (HEPA) filter and/or other filters, that has been pre-sealed in a large airtight or substantially airtight sheet or bag 402. The bag 402 can be constructed from any suitable flexible material, such as a polymer or plastic. The bag 402 has been folded and rolled in a manner that allows it to unroll and expand, for example, expand to the size of the room 408 in which it is located, as the filter device 400 inflates the bag 402. Furthermore, the bag 402 can be adapted to adhere to the walls, ceiling, floor, windows, etc. that define the enclosed space, such as by having an adhesive applied to the bag itself and/or the walls, ceiling, floor, windows, etc. or the bag can adhere by friction forces or by electromagnetic forces (for example, "static cling"). The bag 402 may also include electromagnetic shielding to shield equipment and people located within the bag.

There are two entry seals 404 used in the embodiment shown, both adapted so that when someone enters or exits the bag, they have to "slip" through the seal 404, minimizing air loss and ensuring that an internal positive air pressure is maintained. Outside air enters the bag 402 only through the filters because the bag is pressurized by the filter device 400. A first entry seal may be attached to the bag during initial construction, for example, at the assembly plant or factory that produced the filter device. The first seal may be placed near the filter device at an initial point of expansion of the bag. It may be desirable to include the first entry seal pre-installed on the bag, so that a person can enter the bag during deployment to help it expand properly.

Additional entry seals may be placed on the bag as desired during initial construction, or may be added later, for example, after the bag is deployed. The additional seals may be provided with the filter device, for example, provided in a pouch 412 attached to the filter device. Once the bag is partially or fully expanded, additional entry seals can be placed on the bag as desired.

Examples of entry seals include self-sealing plastic sheeting or strips and press-lockable plastic sheeting or strips.

An inflated bag as described above can be used as a sterile environment or as a decontamination environment and can be used in conjunction with or in lieu of inflatable, self-supporting tents. The filter device 400 and inflatable bag 402 may be installed within an existing room, which may withstand greater wind forces than a traditional inflatable, self-supporting tent. For example, a sterile surgical operating room can be deployed within an enclosed space, such as a garage, home, or office. If the bag 402 is slightly punctured after deployment, the positive pressure within the bag 402 can prevent the migration of unfiltered or contaminated air into the bag 402 through the puncture.

The filter device 400 may be provided with adjustable air dampers 420 and 422 for allowing pressure and speed of inflation adjustment and regulation. To inflate the bag 402 quickly, a room air intake baffle 422 may be closed, so that all of the air moved by filter device is exterior air pulled into the bag. Once the bag is inflated, the baffles may be readjusted to filter both air interior to the bag and exterior air simultaneously to maintain a desired positive pressure within the bag. Sensors 414, solenoids, relays, and/or computer-controlled components can be incorporated into the filter device 400 to automatically adjust and regulate airflow either from a hardwired or wireless communications or control link 419, for example by a control 418 operated by an operator or programmable controller. Oxygen level sensors, toxic fume level sensors, humidity level sensors, or other sensors can be incorporated into the filter cartridges.

In addition to being deployable within structures, the filter device can be deployed within a tent, such as a military tent, for example. The filter device may also be deployed within hospital operating rooms to provide a sterile environment. If used within operating rooms, the bags can be replaced at regular intervals or on a surgery-by-surgery basis. Air scrubbers, ultraviolet lights, and/or disinfectant devices can be added to or controlled by the filter device.

Figure 10:
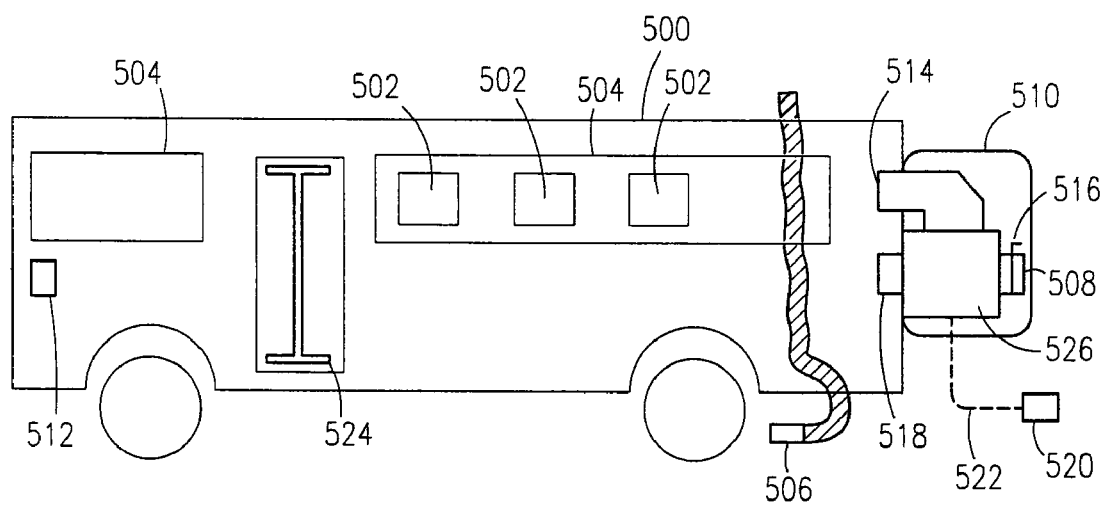
FIG. 10 is an elevation view of a vehicle having a filter device.

Turning to FIG. 10, a vehicle 500, for example, a bus, is shown having a filter device 526 comprising a fresh air intake 508, a room air intake 518, a filtered air exhaust 514 and filters, wherein all large openings 502 into the vehicle, for example, windows, doors, and roof-top ventilation openings have been covered with a substantially airtight material 504 to seal the interior of the vehicle, and wherein an entrance of the vehicle has been sealed by an entry seal 524. The substantially airtight material 504 for sealing the interior of the vehicle 500 can be constructed from a flexible polymer material and can be adapted to adhere to the vehicle as discussed above with respect to the flexible bag. Large openings 502 into the vehicle may be sealed from within the vehicle and/or from the exterior of the vehicle.

The vehicle can be equipped with an exhaust director or re-router 506 to ensure that exhaust gas is directed away from the filter device's fresh-air intake 508. Alternatively, the filter device's fresh air intake 508 can be directed away from the vehicle's exhaust gasses by an intake re-router.

If the vehicle is equipped with an emergency exit door 510, the filter device 526 can be adapted to mount within such opening. The filter device 526 can include means 512 for sensing an open condition on one or more other openings into the vehicle, for example, monitoring the movement of a main door opening lever. When the filter device 526 senses an open condition, it can increase the air pressure within the vehicle to compensate for any pressure drop due to the open door. For example, the filter device can compensate for pressure drop by increasing motor speed, activating an auxiliary fan or impeller, and/or adjusting intake baffles 516 on the filter device. Furthermore, a wireless communications link 522 can receive and transmit information to and from the vehicle. For example, exterior sensors can transmit data for weather reports, smog alters, or the compiling of scientific research data regarding weather phenomena. Along with the above-mentioned sensing means 512, solenoids, relays, and/or computer-controlled components can be incorporated into the filter device 400 to automatically adjust and regulate airflow either from a hardwired or wireless communications or control link 522, for example by a control 520 operated by an operator or programmable controller. Oxygen level sensors, toxic fume level sensors, humidity level sensors, or other sensors can be incorporated into the filter device.

A vehicle equipped with a filter device 526 as described above can provide an emergency evacuation vehicle for removing people from contaminated areas.

Figure 11:
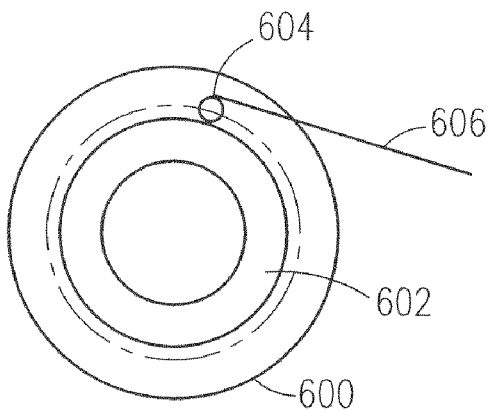
FIG. 11 is an upper plan view of a sealable filter device.
Figure 12:
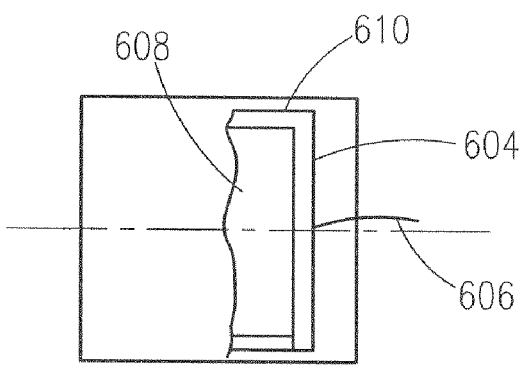
FIG. 12 is an elevation view of the filter device of FIG. 11.

Turning to FIGS. 11-19, a filter unit 600 for an enclosed space, for example, a room is shown. One or more filters, for example, one or more high-efficiency particulate air (HEPA) filters, are located within a casing. In FIGS. 11 and 12, the filter includes a sealing roll 604 and string assembly 606. The sealing roll 604 comprises an airtight material 608 that prevents the passage of air through it, such as a roll of plastic wrap, for example. The airtight material 608 is rolled onto a tube 604. The airtight material includes sealant tape 610 or adhesive on its edges.

When it is time to change the filter, the filter device is left running and the string 606 is pulled and the sealing roll 604 wraps and seals the circumference of the filter 602. The filter device is then turned off and the filter 602 discarded.

The above-described process for sealing and removing the filter 602 seals airborne contaminates that have been captured by the filter within the filter, which allows for safe removal of a contaminated filter. By sealing the filter 602 prior to removal, an operator will not be exposed to the captured airborne contaminants.

FIG. 12 shows a side view of the filter. The string 606 is pulled to the right, which causes the sealing roll 604 to circumnavigate the filter 602 by rolling around it. This action causes the airtight material 608 to unroll and surround the filter. The airtight material adheres to the filter due to the presence of the sealant tape 610 or adhesive.

Figure 13:
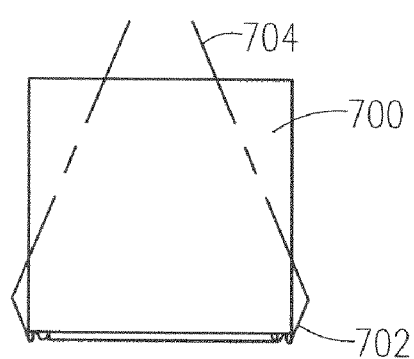
FIG. 13 is an elevation view of a sealable filter device.
Figure 14:
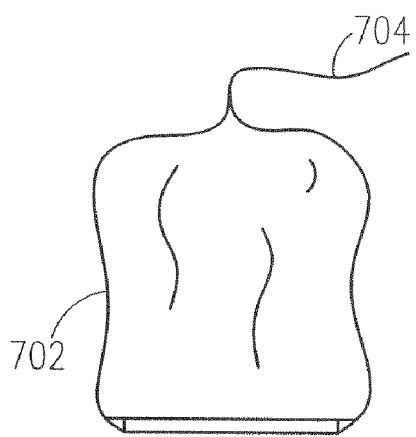
FIG. 14 is an elevation view of the filter device of FIG. 13.

FIGS. 13 and 14 show a filter 700 having an airtight bag 702 with a drawstring 704. When the string 704 is pulled, the bag 702 is pulled from below the filter 700. Continued pulling on the string 704 causes the bag 702 to surround the filter 700. The bag 702 is then cinched tight by further pulling on the string 704.

FIGS. 15 and 16 show a packaged filter 800 having a string 802 that, when pulled, causes a pleated or airtight sealing material 806 to move across and seal the filter 800. FIG. 15 is a side view of the packaged filter 800. A slat 804 is shown to which the string 802 is attached. Sealing material 806 is attached to the lower left corner of the filter 800, wrapped over the slat 804, and then under the filter 800. An adhesive cover 808, for example, tapes that when pulled exposes adhesive, is shown attached to the sealing material 806 and the lower right corner of the filter 800. When the string 802 is pulled, the slat 804 moves upward, tensioning the sealing material 806 as it is applied to the filter 800. The same motion also causes the adhesive cover 808 to be pulled back, exposing adhesive attached to the sealing film. FIG. 16 is a front view of the filter shown in FIG. 15. Tracks 810 can be seen that guide the slat 804 as it moves up the side of the filter 800.

FIGS. 17 and 18 show filter packaging and seals. FIG. 17 shows a side view of a filter cartridge 900 that is substantially cubical in shape. The cartridge 900 is intended to be inserted into a window-mounted air purification device. Three of the sides of the cartridge include the features detailed in FIGS. 17 and 18. The cartridge 900 includes a cover 902 having a pull-tab 904. When the pull tab 904 is pulled, the cover 902 separates and is removed from the cartridge 900. Removing the cover 902 also pulls punch-outs 906 from the sides of the cartridge 900, exposing the filter surfaces 910 or air ports of the cartridge. Because the cartridge 900 includes the cover 902, the cartridge 900 may be stored without being placed into a box.

FIG. 18 shows the cover 902 and punch out 906 attached to the cover 902, which has been removed from one side of the filter cartridge 900, exposing the filter 910 and seal 908. The cartridge 900 may be inserted and removed from a frame that holds the cartridge 900 in an operating position in the window air purification unit. The cartridge 900 has three punch-outs 906 with seals 908. Two of the punch-outs 906 expose filters 910 or sets of filters, one side for outside air and the other for existing room air. The third punch out exposes air ports which seal against a section of the window air purification that houses a fan.

Figure 19:
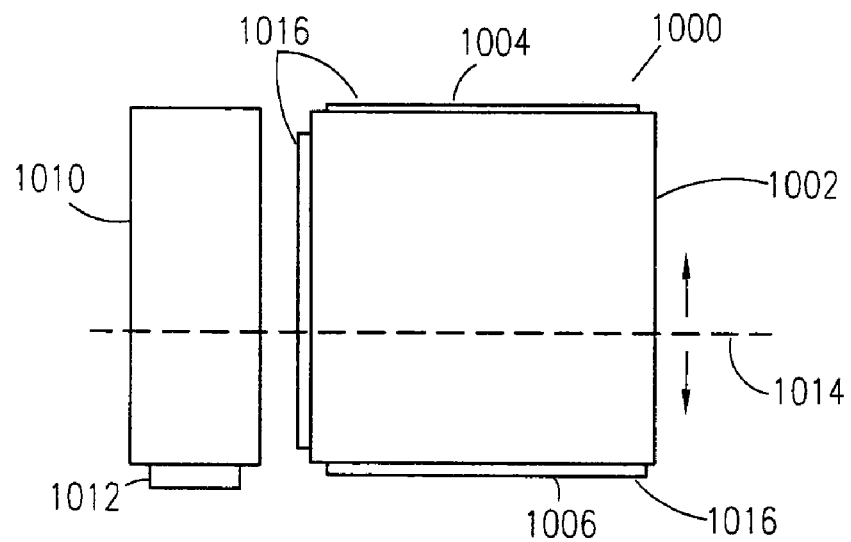
FIG. 19 is a plan view of a sealable packaged window-mounted filter.

FIG. 19 is a top view of a window-mounted air purification device 1000 comprising a motor/fan unit 1010, a filtered air outlet 1012, and seals 1016 in a general positioning of the filter cartridge 1002. The seals 1016 cover, for example, outside air filters 1004, inside air filters 1006 and a side of the filter cartridge facing to the motor/fan unit 1010. A broken line 1014 shows a position of the framing for holding the cartridge 1002 in the operating position. The broken line 1014 divides the air purification device 1000 to outside and inside of the window. The upper portion from the broken line 1014 shows the outside of the window, and the lower portion from the broken line 1014 shows the inside of the window. The position of the broken line 1014 is readily changeable toward the outside or inside due to the state of the device installation.

The embodiment of FIGS. 17-19 can include a sealing system as previously described, which includes a sealing material for wrapping around or otherwise enclosing the filter.

Figure 20:
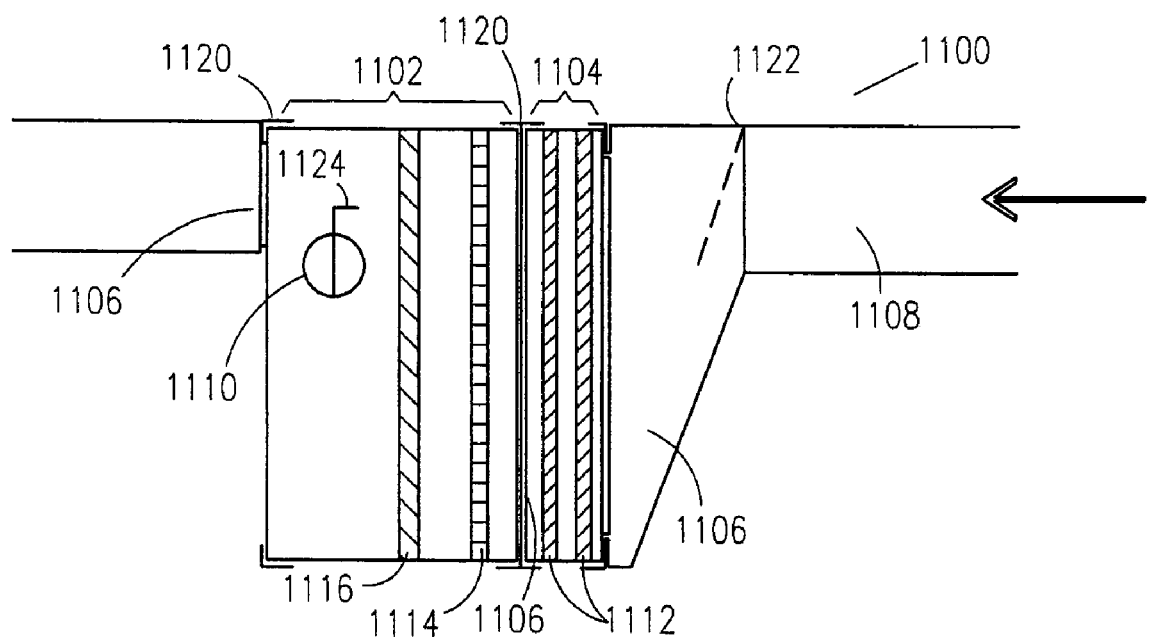
FIG. 20 is a side elevation views of a filter cartridge for a building's heating, ventilation and air-condition system.

Turning to FIG. 20, filter cartridges for a building's heating, ventilation and air-condition (HVAC) system is shown. FIG. 20 shows an assembled filter unit 1100 having two separate filter cartridges that can be changed independently of one another. Seals 1106 are shown that provide airtight seals between filter cartridges or between a filter cartridge and an air duct system. One of the two filters shown is a high-efficiency particulate air (HEPA) filter cartridge 1102 and the other is a media furnace filter cartridge 1104. Filters in the high-efficiency particulate air (HEPA) filter cartridge 1102 is one or more of a pre-filter and high-efficiency particulate air (HEPA) filter, and filters in the media furnace filter cartridge 1104 is one or more of a furnace filter. Each cartridge is essentially a box, for example, a cardboard box that has been adapted to be an airtight shell into which filters have been sealed to create multiple layers, and, therefore, multiple stages, of filtering. The cartridges can include a sealing system as previously described, which includes a sealing material for wrapping around or otherwise enclosing a cartridge. In addition to the filters 1114 and 1116 for circulated air, the filter cartridge 1102 may include filters (not shown) for outside air drawn from the outside air intake 1110.

The cartridges may include an inner and/or outer surface that has been laminated with plastic or other material which increases durability, air-tightness, and lifespan of the cartridge. The filters 1112, 1114 and 1116 have been sealed into the cartridges at the point of manufacture respectively. The cartridges and air duct system are adapted to permit insertion and withdrawal of the cartridges from the ductwork 1108 of the air duct system. The filter cartridges are disposable and need not be opened. Opening a used filter cartridge raises the possibility of releasing filtered contaminates into the environment.

The air duct filter system can also include additional cartridges having activated charcoal pre- or post-filters, or other types of filter elements.

Prior to removal of the furnace filter cartridge for disposal, pull-strings or pull-tabs are pulled while the heating, ventilation and air-condition (HVAC) system is running to seal the cartridge. The heating, ventilation and air-condition (HVAC) system continues to run during replacement of the furnace filter cartridge. Prior to removal of the high-efficiency particulate air (HEPA) filter cartridge, pull-strings or pull-tabs are pulled while the heating, ventilation and air-condition (HVAC) system is running to seal the cartridge. The heating, ventilation and air-condition (HVAC) system is then turned off and the high-efficiency particulate air (HEPA) cartridge replaced.

Still referring to FIG. 20. Lips can be provided on the air duct system. When the cartridges are inserted, the seals 1106 on the cartridges compress against the lips to provide an airtight seal. Seals 1106 are shown generally where they would be located on the cartridges.

Framing 1120 for holding the cartridges in place is also shown. The construction of the filter cartridges makes it unnecessary to enclose them in a cabinet or box included with the ductwork 1108. However, the cartridges may be included in ductwork 1108 boxes or cabinets if desired.

The cartridges are intended to be installed on the upstream side of a heating, ventilation and air-condition (HVAC) device, such as a furnace. The cartridges do not have any air-moving devices, for example, fans, and rely on the furnace to move air through them. When the heating, ventilation and air-condition (HVAC) device is running, it will deliver positive pressure (via an outside air intake 1112), filtered conditioned space air, and filtered outside air.

If a filter cartridge includes an air-moving device, it should be installed on the downstream side of the heating, ventilation and air-condition (HVAC) device, so that it does not pressurize the heating, ventilation and air-condition (HVAC) device and force processed air into the utility room space through leaks in the heating, ventilation and air-condition (HVAC) device. Pressurizing the heating, ventilation and air-condition (HVAC) device can also adversely affect the operation of miscellaneous sensors on the heating, ventilation and air-condition (HVAC) device, such as oxygen sensors, for example. A downstream filter cartridge having an air-moving device can be located anywhere in the air duct system, and is not limited to a location near the heating, ventilation and air-condition (HVAC) device. For example, a filter cartridge having an air-moving device can be located so as to perform its functions in one or more spaces in a structure as a priority over other spaces.

A communications or control link, for example by hardwired or wireless communications link, can be provided between the heating, ventilation and air-condition (HVAC) device and the filter cartridge having an air-moving device. Such a link can provide coordinated operations of the heating, ventilation and air-condition (HVAC) device and the air-moving device in the filter cartridge. For example, it may be desirable to turn-off the air-moving device whenever the heating, ventilation and air-condition (HVAC) device runs.

An outside air intake baffle 1124 for the outside air intake 1110 is shown. The baffle provides for regulation of the amount of drawn fresh air. Closing the baffle will prevent the drawing of fresh air. Conversely, fully opening the baffle will maximize the drawing of fresh air. An additional adjustable baffle in the ductwork 1122 is also shown. Adjustment of the additional baffle 1122 and the air intake baffle 1124 allow for regulation of the positive pressure provided by the filter system.

Sensors, solenoids, relays, and/or computer-controlled components can be incorporated into the filter system to automatically adjust and regulate airflow either from a control panel operated by an operator or programmable controller, or from the heating, ventilation and air-condition (HVAC) device's control system. Oxygen level sensors, toxic fume level sensors, humidity level sensors, or other sensors can be incorporated into the filter cartridges.

Filter assemblies can be operated and controlled from a remote location, such as over a hardwired communications link, for example, over the telephone, or over a wireless communications link, such as radio or microwave link. An emergency condition, such as the release of a toxic substance, can trigger one or more filters to start running. Furthermore, a filter can be provided with an output means, such as a speaker or message screen, for providing information, such as emergency instructions. For example, a filter installed in an automobile can also provide emergency instructions such as an evacuation route, for example.

Further regarding a filter device installed in an automobile, the automatic or manual climate control system of an automobile can be adapted to monitor and adjust air quality automatically. Sensors to monitor both inside and outside air can be incorporated to read air temperature, barometric pressure, humidity, smog levels, carbon monoxide levels, and other environmental conditions. The climate control system can monitor and adjust in-cabin air automatically for optimal air quality. Furthermore, a wireless communications link can receive and transmit information to and from the vehicle. For example, exterior sensors can transmit data for weather reports, smog altars, or the compiling of scientific research data regarding weather phenomena.

Sensors that detect in-cabin carbon monoxide levels can trigger an alarm that signals a remote site over the wireless communications link. The driver of the vehicle can then be contacted and/or emergency response personnel notified. For example, if the driver fails to respond, an ambulance can be dispatched to the vehicle's location.

Exterior sensors that monitor for radioactivity, various chemicals, or biological agents can be incorporated into the system, allowing vehicles having the sensors and communications link to form detection and warning system.

While specific embodiments of the invention have been described and illustrated, it is to be understood that these embodiments are provided by way of example only and that the invention is not to be construed as being limited thereto but only by proper scope of the following claims.

What is claimed is:

1. A filter assembly for providing filtered air to an enclosed space, said filter assembly comprising:
   a housing comprising an exhaust port in fluid communication with the enclosed space,
      a first air intake port in fluid communication with the enclosed space, and
      a second air intake port in fluid communication with a space exterior to the enclosed space;
   at least one disposable filter for filtering air from at least one of said first air intake port and said second air intake port, wherein said filter assembly is arranged for simultaneously filtering recirculated air drawn from said enclosed space through said first air intake port and filtering pressurizing air drawn from the space exterior to the enclosed space through said second air intake port, and further wherein said filtered air is provided to the enclosed space through said exhaust port, and further wherein an air pressure within the enclosed space exceeds an air pressure in the space exterior to the enclosed space when pressurizing air is drawn from the space exterior to the enclosed space and provided to the enclosed space;
   a first air damper for adjusting an air flow through the first air intake port; and
   a second air damper for adjusting an air flow through the second air intake port, wherein the air pressure within the enclosed space is adjustable through an adjustment of the first air damper while the second air damper is maintained in a fully open position during said adjustment, wherein at least one of the at least one disposable filter comprises a high-efficiency particulate air filter, and wherein the filter assembly further comprises a disposable pre-filter for filtering air prior to filtering by said high-efficiency particulate air filter, and wherein the pre-filter and the high-efficiency particulate air filter are located within a cartridge, and wherein said cartridge is removable from said housing, and further wherein said assembly is configured such that air flow from said second air intake port to either said exhaust port or to said first air intake port must pass through at least one disposable filter regardless of the status of any of said dampers and regardless of the operation of any fan.

2. The filter assembly according to claim 1 further comprising a selectively deployable seal for sealing the second air intake port so as to prevent filtered contaminants within said filter assembly from passing through the second air intake port.

3. The filter assembly according to claim 1 wherein said first air intake port includes a grill.

4. The filter assembly according to claim 1, wherein said filter assembly is mounted within a window.

5. The filter assembly according to claim 1, further comprising an ionic or electronic filter.

6. The filter assembly according to claim 1, wherein said enclosed space is at least partially enclosed by a substantially or completely airtight sheet.

7. The filter assembly according to claim 1 or 6, wherein said enclosed space is located within a vehicle.

8. The filter assembly according to claim 7 further comprising an automatic climate control system for automatically monitoring and adjusting an air quality of said enclosed space.

9. The filter assembly according to claim 1 further comprising a fan for moving air through said filter assembly and a sensor for monitoring an environmental condition, wherein an operation of said fan is controlled based on the monitored environmental condition.

10. The filter assembly according to claim 7 further comprising a fan for moving air through said filter assembly and a sensor for monitoring an environmental condition, wherein an operation of said fan is controlled based on the monitored environmental condition.

11. The filter assembly according to claim 10, wherein said fan is adapted to be controlled from a remote location over a wireless communications link.

12. The filter assembly according to claim 1, further comprising a selectively deployable seal for sealing the first air intake port so as to prevent filtered contaminants within said filter assembly from passing through the first air intake port into the enclosed space.

13. A filter assembly for providing filtered air to an enclosed space, said filter assembly comprising:
a housing including:
an exhaust port in fluid communication with the enclosed space,
a first air intake port in fluid communication with the enclosed space, and
a second air intake port in fluid communication with a space exterior to the enclosed space;
a first air damper for adjusting an air flow through the first air intake port;
a second air damper for adjusting an air flow through the second air intake port;
at least one disposable filter for filtering air from both said first air intake port and said second air intake port, wherein
said filter assembly is arranged to prevent air from said second air damper from being routed around said filter thereby requiring said air from said second air damper to be filtered before being exhausted, and further wherein
said filtered air is provided to the enclosed space through said exhaust port such that air pressure within the enclosed space exceeds the air pressure in the space exterior to the enclosed space when pressurizing air is drawn from the space exterior to the enclosed space and provided to the enclosed space, and wherein
said assembly is configured such that air flow from said second air intake port to either said exhaust port or to said first air intake port must pass through at least one disposable filter regardless of the status of any of said dampers and regardless of the operation of any fan.

14. The assembly of claim 13, wherein the disposable filter comprises a high-efficiency particulate air filter, and wherein the filter assembly further comprises a disposable pre-filter for filtering air prior to filtering by said high-efficiency particulate air filter, and wherein the pre-filter and the high-efficiency particulate air filter are located within a cartridge, and wherein said cartridge is removable from said housing.

15. A filter assembly for providing filtered air to an enclosed space, said filter assembly comprising:
a housing including:
an exhaust port in fluid communication with the enclosed space,
a first air intake port in fluid communication with the enclosed space, and
a second air intake port in fluid communication with a space exterior to the enclosed space;
a first air damper for adjusting an air flow through the first air intake port;
a second air damper for adjusting an air flow through the second air intake port;
at least one disposable filter for filtering air from said first air intake port or said second air intake port, wherein
said filter assembly is arranged to prevent air from said first intake port and said second intake port from being routed around said filter to said exhaust port, regardless of the state of said dampers and regardless of the operating state of any fan and further wherein
said filtered air is provided to the enclosed space through said exhaust port such that air pressure within the enclosed space exceeds the air pressure in the space exterior to the enclosed space when pressurizing air is drawn from the space exterior to the enclosed space and provided to the enclosed space, wherein
said assembly is configured such that air flow from said second air intake port to either said exhaust port or to said first air intake port must pass through at least one disposable filter regardless of the status of any of said dampers and regardless of the operation of any fan.

16. The filter assembly according to claim 15 further comprising a selectively deployable seal for sealing the second air intake port so as to prevent filtered contaminants within said filter assembly from passing through the second air intake port.

17. A filter assembly for providing filtered air to an enclosed space, said filter assembly comprising:
a housing comprising an exhaust port in fluid communication with the enclosed space, a first air intake port in fluid communication with the enclosed space, and a second air intake port in fluid communication with a space exterior to the enclosed space;

a disposable filter for filtering air from at least one of said first air intake port and said second air intake port, wherein said filter assembly is arranged for simultaneously filtering recirculated air drawn from said enclosed space through said first air intake port and filtering pressurizing air drawn from the space exterior to the enclosed space through said second air intake port, and further wherein said filtered air is provided to the enclosed space through said exhaust port, and further wherein an air pressure within the enclosed space exceeds an air pressure in the space exterior to the enclosed space when pressurizing air is drawn from the space exterior to the enclosed space and provided to the enclosed space; and an electromagnetic shielding for shielding said enclosed space, wherein said enclosed space is at least partially enclosed by a substantially or completely airtight sheet.

\* \* \* \* \*

UNITED STATES PATENT AND TRADEMARK OFFICE
CERTIFICATE OF CORRECTION

| | | |
|---|---|---|
| PATENT NO. | : 7,833,305 B1 | Page 1 of 1 |
| APPLICATION NO. | : 11/379325 | |
| DATED | : November 16, 2010 | |
| INVENTOR(S) | : Studer | |

It is certified that error appears in the above-identified patent and that said Letters Patent is hereby corrected as shown below:

In column 3, line 58, please delete the number "13" after the second appearing word -motor-, In column 3, line 59, please delete the number "13" after the word -motor- and before the word -can-, In column 7, line 20, please replace the word "HERA" with the word -HEPA-, In column 7, line 47, please delete the number "208" before the word -or-, In column 8, line 56, please replace the word "HERA" with the word -HEPA-, In column 8, line 60, please replace the word "HERA" with the word -HEPA-.

Signed and Sealed this
First Day of February, 2011

David J. Kappos
*Director of the United States Patent and Trademark Office*